United States Patent
Wang et al.

(10) Patent No.: US 9,196,055 B2
(45) Date of Patent: Nov. 24, 2015

(54) METHOD AND APPARATUS FOR PROVIDING A MECHANISM FOR GESTURE RECOGNITION

(75) Inventors: Kongqiao Wang, Beijing (CN); Lei Xu, Beijing (CN); Jiangwei Li, Beijing (CN); Yingfei Liu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/996,751

(22) PCT Filed: Dec. 31, 2010

(86) PCT No.: PCT/CN2010/080558
§ 371 (c)(1),
(2), (4) Date: Jun. 21, 2013

(87) PCT Pub. No.: WO2012/088702
PCT Pub. Date: Jul. 5, 2012

(65) Prior Publication Data
US 2013/0279763 A1    Oct. 24, 2013

(51) Int. Cl.
*G06T 7/20* (2006.01)
*G06K 9/00* (2006.01)
*G06K 9/46* (2006.01)

(52) U.S. Cl.
CPC .......... *G06T 7/2033* (2013.01); *G06K 9/00355* (2013.01); *G06K 9/4642* (2013.01)

(58) Field of Classification Search
USPC ........... 382/103, 159, 209; 348/148, 179, 621
See application file for complete search history.

(56) References Cited

U.S. PATENT DOCUMENTS

| | | | | |
|---|---|---|---|---|
| 5,454,043 A * | 9/1995 | Freeman | | 382/168 |
| 6,944,315 B1 * | 9/2005 | Zipperer et al. | | 382/103 |
| 7,373,012 B2 * | 5/2008 | Avidan et al. | | 382/260 |
| 7,702,131 B2 * | 4/2010 | Chinen et al. | | 382/103 |
| 8,532,737 B2 * | 9/2013 | Cervantes | | 600/407 |
| 2006/0245618 A1 * | 11/2006 | Boregowda et al. | | 382/107 |

(Continued)

FOREIGN PATENT DOCUMENTS

CN    101694723 A    4/2010
CN    101763515 A    6/2010

(Continued)

OTHER PUBLICATIONS

Davis, James W. "Recognizing Movement using Motion Histograms". M.I.T Media Laboratory Perceptual Computing Section Technical Report No. 487. 1999.*

(Continued)

*Primary Examiner* — Kim Vu
*Assistant Examiner* — Molly Delaney
(74) *Attorney, Agent, or Firm* — Alston & Bird LLP (57) ABSTRACT

A method for providing a mechanism for gesture recognition may include causing down-sampling of image data received to generate down-sampled image blocks for a plurality of image frames, causing extraction of a plurality of features from the down-sampled image blocks, determining a moving status of the down-sampled image blocks based on changes in values of respective features in consecutive frames, and determining a direction of motion of an object in the image data based on movement of a first border and a second border of a projection histogram determined based on the moving status of respective down-sampled image blocks. A corresponding apparatus and computer program product are also provided.

14 Claims, 5 Drawing Sheets

(56) References Cited

U.S. PATENT DOCUMENTS

| | | | | |
|---|---|---|---|---|
| 2006/0269111 | A1* | 11/2006 | Stoecker et al. | 382/128 |
| 2007/0047809 | A1* | 3/2007 | Sasaki | 382/170 |
| 2007/0280355 | A1* | 12/2007 | Karkkainen | 375/240.15 |
| 2009/0087028 | A1 | 4/2009 | Lacey et al. | |
| 2009/0154795 | A1* | 6/2009 | Tan et al. | 382/155 |
| 2009/0192990 | A1* | 7/2009 | Chin et al. | 707/3 |
| 2009/0208061 | A1* | 8/2009 | Matsumoto et al. | 382/107 |
| 2009/0243515 | A1* | 10/2009 | Kwisthout | 315/307 |
| 2010/0316299 | A1 | 12/2010 | Lee et al. | |
| 2011/0001813 | A1* | 1/2011 | Kim et al. | 348/77 |
| 2011/0242286 | A1* | 10/2011 | Pace et al. | 348/47 |
| 2011/0299737 | A1* | 12/2011 | Wang et al. | 382/107 |
| 2012/0313781 | A1* | 12/2012 | Barker et al. | 340/540 |
| 2014/0169469 | A1* | 6/2014 | Bernal et al. | 375/240.16 |

FOREIGN PATENT DOCUMENTS

| | | | |
|---|---|---|---|
| JP | 2009-514109 | A | 4/2009 |
| KR | 2009-0111913 | A | 10/2009 |
| KR | 2010-0025048 | A | 3/2010 |
| WO | 2007/053469 | A2 | 5/2007 |
| WO | 2010049790 | A1 | 5/2010 |

OTHER PUBLICATIONS

Meng, Hongying, Pears, Nick, Freeman, Michael, Bailey, Chris. "Motion History Histograms for Human Action Recognition." Embedded Computer Vision Advances in Pattern Recognition. 2009.*

Kuo, Chung Ming, Hseih, Chaur Heh, Huang, Yong Ren. "Automatic extraction of moving objects for head-shoulder video sequence". J. Vis. Commun. Image R. 16 (2005).*

International Search Report and Written Opinion received for corresponding Patent Cooperation Treaty Application No. PCT/CN2010/080558, dated Sep. 8, 2011, 10 pages.

Office Action from Korean Patent Application No. 2013-7020214, dated May 28, 2015.

"GestureTek Labs: Patent and Technology Licensing Program", Gesture Tek, Retrieved on Dec. 19, 2014, Webpage available at: http://www.gesturetek.com/products/technologyandlicensing.php.

Ong et al., "A Boosted Classifier Tree for Hand Shape Detection", Proceedings of the Sixth IEEE International Conference on Automatic Face and Gesture Recognition, May 17-19, 2004, 6 pages.

Kolsch et al., "Robust Hand Detection", Proceedings of Sixth IEEE International Conference on Automatic Face and Gesture Recognition, May 17-19, 2004, 6 pages.

Lee et al., "Hand region extraction and gesture recognition from video stream with complex background through entropy analysis", Proceedings of the 26th Annual International Conference of the IEEE Engineering in Medicine and Biology Society, vol. 1, Sep. 1-5, 2004, pp. 1513-1516.

Niu et al., "A Moving Objects Detection Algorithm Based on Improved Background Subtraction", Eighth International Conference on Intelligent Systems Design and Applications, vol. 3, Nov. 26-28, 2008, pp. 604-607.

Hayakawa et al., "Block-Matching-Based Motion Field Generation Utilizing Directional Edge Displacement", Computers & Electrical Engineering, Signal Processing and Communication Systems, vol. 36, Issue 4, Jul. 2010, 6 pages.

Hao et al., "Digit-Writing Hand Gesture Recognition by Hand-Held Camera Motion Analysis", 3rd International Conference on Signal Processing and Communication Systems, Sep. 28-30, 2009, pp. 1-5.

Office action received for corresponding Korean Patent Application No. 2013-7020214, dated Oct. 31, 2014, 6 pages of office action and No English translation available.

Office Action for Chinese Application No. 201080071036.9 dated Mar. 2, 2015.

Changkui, L., *A New Motion Detection and Contour Tracking Method*, Geomatics and Information Science of Wuhan University (Journal of Wuhan University: Information Technologies) vol. 30, No. 8 (Aug. 2005) 723-727.

* cited by examiner

METHOD AND APPARATUS FOR PROVIDING A MECHANISM FOR GESTURE RECOGNITION

RELATED APPLICATION

This application was originally filed as Patent Cooperation Treaty Application No. PCT/CN2010/080558 filed Dec. 30, 2010.

TECHNOLOGICAL FIELD

Some example embodiments of the present invention relate generally to user interface technology and, more particularly, relate to a method and apparatus for providing a mechanism for gesture recognition.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase the ease of information transfer and convenience to users relates to simplifying human to machine interfaces for HCI (human-computer interaction). With recent developments in the area of the computing devices and hand-held or mobile devices improving the capabilities of such devices, next generation HCI is on the minds of many. Furthermore, given that the devices will tend to increase in their capacity to create content, store content and/or receive content relatively quickly upon request, and given also that mobile electronic devices such as mobile phones often face limitations in display size, text input speed, and physical embodiments of user interfaces (UI), challenges are often created in the context of HCI.

Furthermore, improvements in HCI may also enhance user enjoyment and open possibilities for user interface with computing devices in environments that may otherwise have presented changes for effective HCI. One such improvement relates to gesture recognition. Compared with other interactive mechanisms currently employed in HCI such as, for example, keypad and mouse, some may consider gesture recognition to improve the naturalness and facility of communication. As such, certain applications have been developed to enable gesture recognition for use as a command controller in digital home appliances, for use in file/web navigation or for use as a substitute for the commonly used remote controller. However, current mechanisms for gesture analysis are often slow or cumbersome to employ. Given the general utility of next generation HCI, improvements in gesture analysis may be desirable.

BRIEF SUMMARY

A method, apparatus and computer program product are provided to enable the provision of a mechanism to employ gesture recognition. For example, some embodiments may employ a substantially real time vision-based kinetic hand gesture recognition algorithm.

In one example embodiment, a method of providing a mechanism for employing gesture recognition is provided. The method may include causing down-sampling of image data received to generate down-sampled image blocks for a plurality of image frames, causing extraction of a plurality of features from the down-sampled image blocks, determining a moving status of the down-sampled image blocks based on changes in values of respective features in consecutive frames, and determining a direction of motion of an object in the image data based on movement of a first border and a second border of a projection histogram determined based on the moving status of respective down-sampled image blocks.

In another example embodiment, an apparatus for providing a mechanism for employing gesture recognition is provided. The apparatus may include at least one processor and at least one memory including computer program code. The at least one memory and the computer program code may be configured to, with the at least one processor, cause the apparatus to perform at least causing down-sampling of image data received to generate down-sampled image blocks for a plurality of image frames, causing extraction of a plurality of features from the down-sampled image blocks, determining a moving status of the down-sampled image blocks based on changes in values of respective features in consecutive frames, and determining a direction of motion of an object in the image data based on movement of a first border and a second border of a projection histogram determined based on the moving status of respective down-sampled image blocks.

In one example embodiment, another apparatus for providing a mechanism for employing gesture recognition is provided. The apparatus may include means for causing down-sampling of image data received to generate down-sampled image blocks for a plurality of image frames, means for causing extraction of a plurality of features from the down-sampled image blocks, means for determining a moving status of the down-sampled image blocks based on changes in values of respective features in consecutive frames, and means for determining a direction of motion of an object in the image data based on movement of a first border and a second border of a projection histogram determined based on the moving status of respective down-sampled image blocks.

In one example embodiment, a computer program product for providing a mechanism for employing gesture recognition is provided. The computer program product may include at least one computer-readable storage medium having computer-executable program code instructions stored therein. The computer-executable program code instructions may include program code instructions for causing down-sampling of image data received to generate down-sampled image blocks for a plurality of image frames, causing extraction of a plurality of features from the down-sampled image blocks, determining a moving status of the down-sampled image blocks based on changes in values of respective features in consecutive frames, and determining a direction of motion of an object in the image data based on movement of a first border and a second border of a projection histogram determined based on the moving status of respective down-sampled image blocks.

Some embodiments of the invention may provide a method, apparatus and computer program product for improving user experience relating to devices having vision-based user interface capabilities. As a result, for example, mobile terminal users may enjoy improved capabilities with respect to accessing content and other services or applications that may be used in connection with a mobile terminal.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Some embodiments of the present invention may provide a mechanism by which improvements may be experienced in relation to gesture analysis. Moreover, some example embodiments may provide for a relatively fast mechanism by which to accurately determine certain gestures. For example, a hand wave gesture from left to right (or hand swipe gesture from top to bottom) may be detected and recognized accurately and quickly based on computer vision alone. Although some embodiments could be practiced with any computer vision system including, for example, fixed or mobile systems with robust camera devices that are capable of capturing high quality images or capturing images at high frequency, some example embodiments may also be used in connection with lower quality images captured from lower quality cameras or with less frequency.

Figure 1:
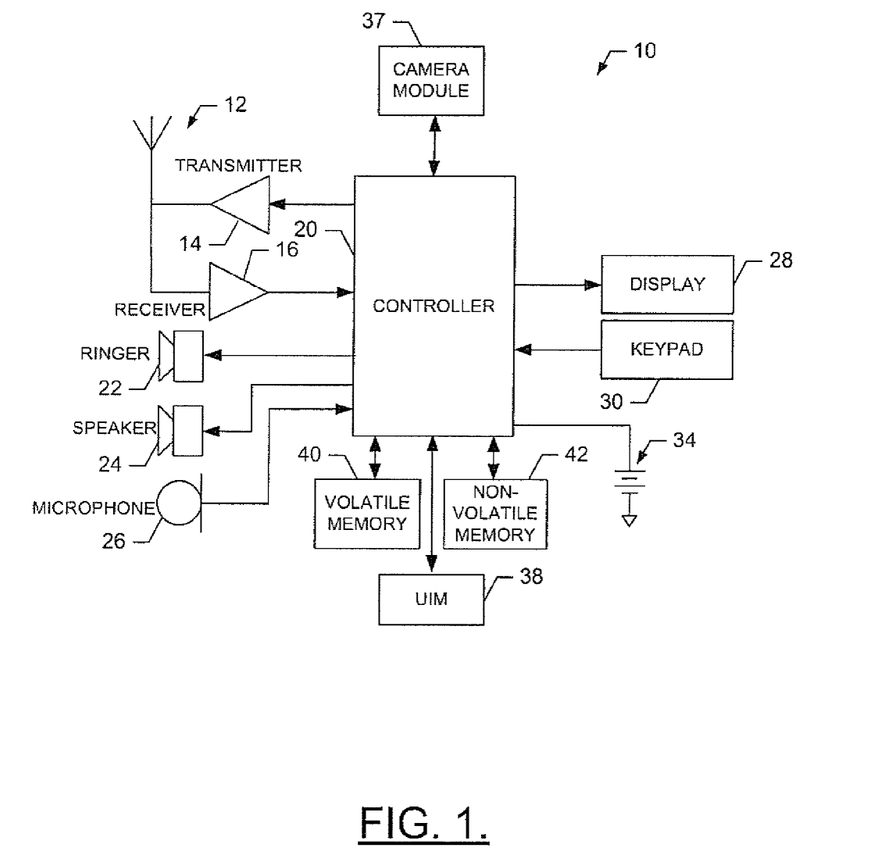
FIG. 1 is a schematic block diagram of a mobile terminal according to an example embodiment of the present invention.

FIG. 1, one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a controller 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with noncellular communication mechanisms. For example, the mobile terminal 10 may be capable of communication in a wireless local area network (WLAN) or other communication networks.

In some embodiments, the controller 20 may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (display 28 providing an example of such a touch display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch display may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In an exemplary embodiment, the mobile terminal 10 may include a media capturing module, such as one or more cameras, video and/or audio modules, in communication with the controller 20. The media capturing module may be any means for capturing an image, video and/or audio for storage, display or transmission. For example, in an exemplary embodiment in which the media capturing module is a camera module 37, the camera module 37 may include a digital camera capable of forming a digital image file from a captured image. As such, the camera module 37 may include all hardware, such as a lens or other optical device, and software necessary for creating a digital image file from a captured image. Although not necessary in all cases, in some exemplary embodiments, the camera module 37 may be a 3D camera capable of capturing 3D image information indicative of depth and intensity. It should also be noted that some example embodiments may be employed in connection with images or video content (among other types of content) that are produced or generated elsewhere, but are available for processing at the mobile terminal 10 (or fixed terminal).

An example embodiment of the invention will now be described with reference to FIG. 2, in which certain elements of an apparatus 50 for providing a mechanism for employing gesture recognition are displayed. The apparatus 50 of FIG. 2 may be employed, for example, in conjunction with the mobile terminal 10 of FIG. 1. However, it should be noted that the apparatus 50 of FIG. 2, may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer or other user terminal. Moreover, in some cases, the apparatus 50 may be on a fixed device such as server or other service platform and the content may be presented (e.g., via a server/client relationship) on a remote device such as a user terminal (e.g., the mobile terminal 10) based on processing that occurs at the fixed device.

Figure 2:
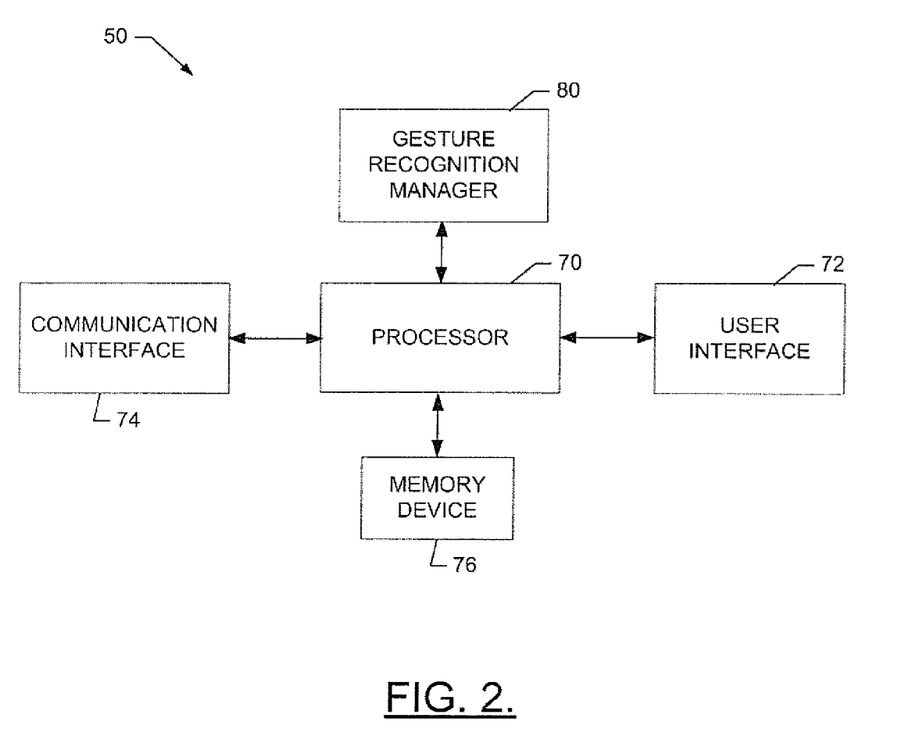
FIG. 2 is a schematic block diagram of an apparatus for providing a mechanism for employing gesture recognition according to an example embodiment of the present invention.

It should also be noted that while FIG. 2 illustrates one example of a configuration of an apparatus for providing a mechanism for employing gesture recognition, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 2, the apparatus 50 for providing a mechanism for employing gesture recognition is provided and may include or otherwise be in communication with a processor 70, a user interface 72, a communication interface 74 and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen(s), touch areas, soft keys, a microphone, a speaker, or other input/output mechanisms. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like). In an example embodiment, the user interface 72 may also include one or more vision systems (e.g., camera module 37) such as a front face or back face camera of a mobile device (e.g., mobile terminal 10) that may be configured to perform gesture detection and recognition as described herein.

In an example embodiment, the processor 70 may be embodied as, include or otherwise control a gesture recognition manager 80. As such, in some embodiments, the processor 70 may be said to cause, direct or control the execution or occurrence of the various functions attributed to the gesture recognition manager 80 as described herein. The gesture recognition manager 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the gesture recognition manager 80 as described herein. Thus, in examples in which software is employed, a device or circuitry (e.g., the processor 70 in one example) executing the software forms the structure associated with such means.

Figure 3:
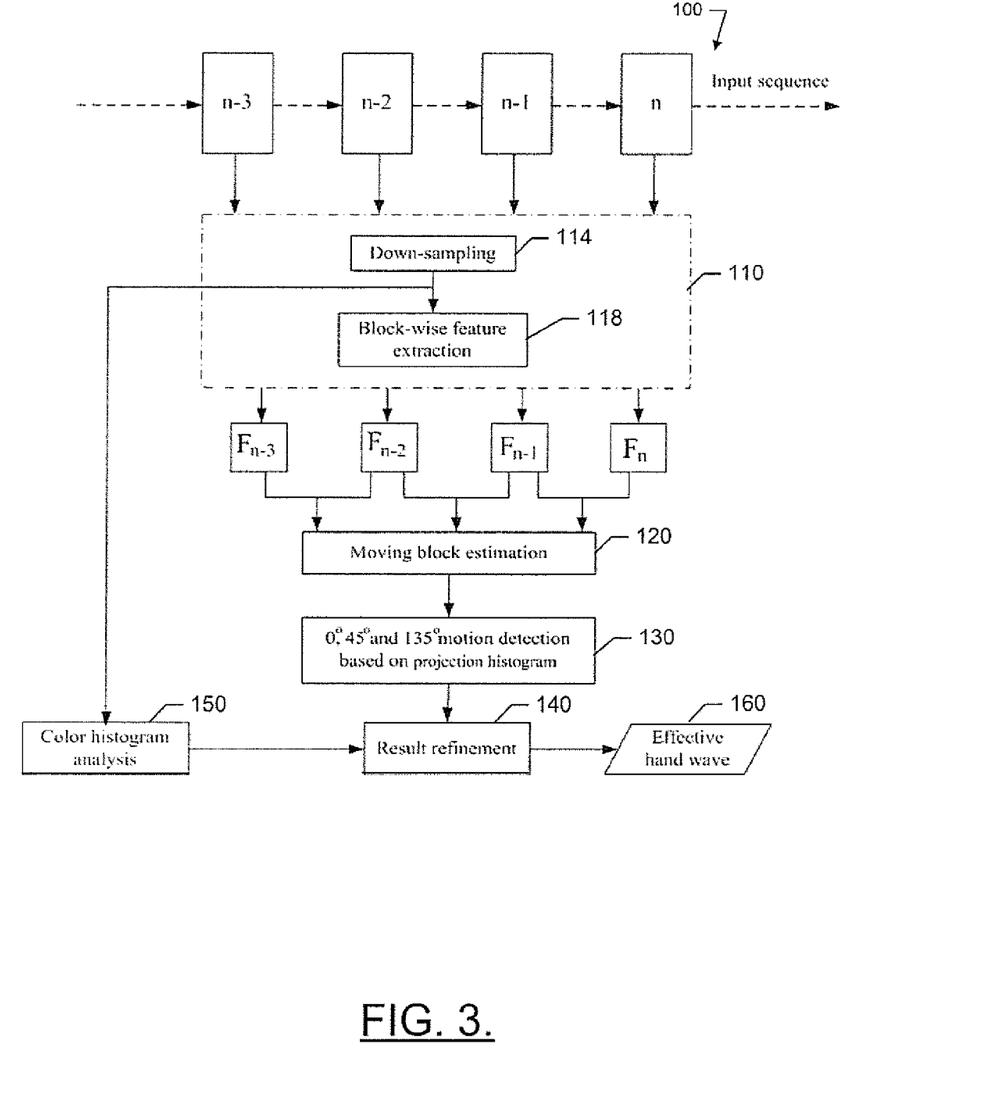
FIG. 3 illustrates an example of the processing that may be undertaken by a gesture recognition manager configured according to an example embodiment of the present invention.

In an example embodiment, the gesture recognition manager 80 may generally be configured to conduct various processing functions associated with gesture detection and recognition as described herein. Thus, for example, the gesture recognition manager 80 may be configured to implement or cause (e.g., responsive to processor control) activities such as pre-processing of image data, performance of moving block estimation, performance of motion detection (e.g., including coarse and fine detection), confirmation or refinement of results, and/or the like. FIG. 3 illustrates an example of the processing that may be undertaken by the gesture recognition manager 80 according to some embodiments.

As shown in FIG. 3, an input sequence of data 100 (e.g., illustrated by n to n−3 in FIG. 3) may be received for preprocessing at operation 110. The preprocessing may generally include operations of down-sampling at operation 114 and feature extraction (e.g., block-wise feature extraction) at operation 118. After feature extraction, moving block estimation may be conducted at operation 120 with respect to each of the various different features (e.g., features $F_n$, $F_{n-1}$, $F_{n-2}$, $F_{n-3}$, etc.). Thereafter, at operation 130, motion detection may be performed based on a projection histogram. In some embodiments, the histograms may be computed for various different directions of motion (e.g., entirely horizontal or 0 degree motion, 45 degree motion, 135 degree motion and/or any other suitable or expected directions that may be encountered). At operation 140, the results may be refined to verify detection results. In an example embodiment, color histogram analysis may be utilized at operation 150 to assist in result refinement. Thereafter, at operation 160, an effective gesture (e.g., a hand wave) may be recognized.

In some embodiments, the preprocessing may include down-sampling, as indicated above, in order to reduce the influence that could otherwise be caused by pixel-wise noise. In an example embodiment, each input image may be smoothed and down-sampled such that a mean value of a predetermined number of pixels (e.g., a patch with 4-pixels height) may be assigned to a corresponding pixel of a down-sampled image. Thus, in an example, the working resolution would be 1/16 of the input one. In an example case, for a working image, $F_{i,j}$, where $1 \le i \le H$, $1 \le j \le W$, where W and H are the width and height of the image, respectively, if given a length λ (10 in one example), the image can be partitioned into MN a set of square blocks $Z_{i,j}$ with $1 \le i \le M$ and $1 \le j \le N$, where M=H/λ and N=W/λ, then for each block, various statistical characteristics may be computed with respect to red, green and blue channels descriptive of the pixel values within the down-sampled image. A plurality of features may then be extracted from the down-sampled image (e.g., 6 in the example of FIG. 6). In an example embodiment, the following 6 statistical characteristics (or features) may be computed including: the mean of the luminance L, the variance of the luminance LV, the mean of the red channel R, the mean of the green channel G, the mean of the blue channel B, and the mean of normalized red channel NR. The normalized red value may be computed as shown in equation 1 below:

$$nr = 255 * r/(r+g+b) \qquad (1)$$

where r, g and b are values of the original three channels, respectively. Example embodiments have shown that the normalized red value may often be the simplest value that may be used to approximately describe the skin color in a phone camera environment. Normally, for a typical skin area (e.g. a hand and/or a face) in the image, the normalized red value will be rather large one, compared with those of the background objects.

Moving block estimation may then be performed with respect to the data corresponding to the 6 statistical characteristics (or features) extracted in the example described above. For gesture detection such as a hand wave detection, the moving status of blocks may be determined by checking for changes between the blocks of a current frame and a previous frame.

More specifically, a block $Z_{i,j,t}$ (where t denotes the index of frame) can be regarded as a moving block, if:

(1) $|L_{i,j,t} - L_{i,j,t-1}| > \theta_1$ or $NR_{i,j,t} - NR_{i,j,t-1} > \theta_2$. This condition stresses the difference between the consecutive frames.

(2) $LV_{i,j,t} < \theta_3$. This condition is based on the fact that the hand area typically has a uniform color distribution.

(3) $R_{i,j,t} > \theta_4$
(4) $R_{i,j,t} > \theta_5 * G_{i,j,t}$ and $R_{i,j,t} > \theta_5 * B_{i,j,t}$
(5) $R_{i,j,t} > \theta_6 * G_{i,j,t}$ or $R_{i,j,t} > \theta_6 * B_{i,j,t}$ Of note, conditions (3-5) show that the red channel typically has a relatively larger value compared with the blue and green channels.

(6) $\theta_7 < L_{i,j,t} < \theta_8$. This is an empirical condition to discard the most evident background objects. In an example embodiment, the above $\theta_1$-$\theta_8$ may be set as 15, 10, 30, 10, 0.6, 0.8, 10 and 240, respectively.

Figure 4:
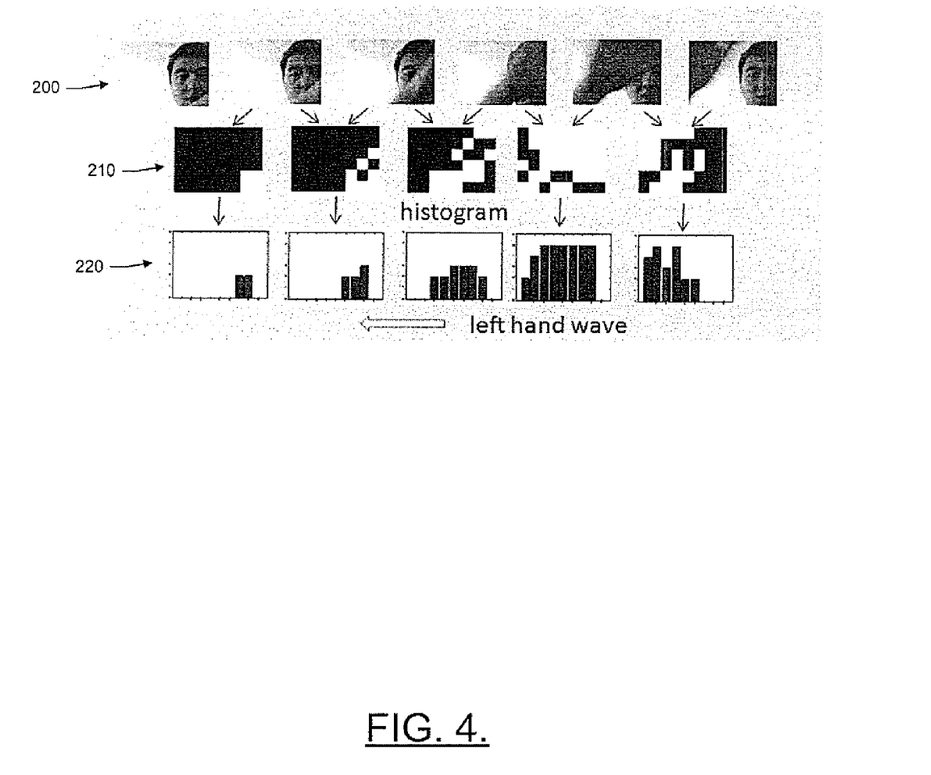
FIG. 4 illustrates a sample image sequence and corresponding image results according to an example embodiment of the present invention.

FIG. 4 illustrates a sample image sequence and corresponding image results according to an example embodiment. Based on the sample image sequence (shown on line 200) determination of moving blocks (e.g., the white blocks in each difference image of line 210) may then be made so that a series of histograms may be determined at line 220 to illustrate the movement of a hand from the right side of the image over to the left side of the image. The detection of motion may be refined in some cases since the area of a hand may typically be larger than the block size. In this regard, for example, the moving blocks may be further refined based on their topology. In an example embodiment, a block without any moving blocks in its 8-connected-block neighborhood may be regarded as a non-moving block. Thus, for example, in an case where there are moving blocks $\Omega_t = \{Z_i | Mov(Z_i) = 1\}$ for a current frame, where $Mov(Z) = 1$ means that block Z is a moving block, histogram analysis may be employed to determine different types of gestures (e.g., different types of hand waves such as left-to-right, up-to-down, forward-to-backward, or vice versa). A specific example for left-to-right detection is described below, however; modifications for employment with the other types can be derived based on the example shown. For a right hand wave, the N-dimensional vertical projection histogram may be computed as:

$$H_{i,t} = \sum_{j=1}^{M} Mov(Z_{j,i,t}), \ 1 \le i \le N \qquad (3)$$

The left border $BL_t$ and right border $BR_t$ of the histogram may be determined by $$BL_t = \min_i (H_{i,t} > 0) \qquad (4)$$

$$BR_t = \max_i (H_{i,t} > 0). \qquad (5)$$

Meanwhile, the process may be repeated for the t−2 and t−1 frames. Based on the data from the latest three frames, the direction of the hand wave can be determined. More specifically, if the following two conditions are satisfied, it may be determined that the detected motion corresponds to a right wave in the sequence:

$$BR_t > BR_{t-1} + 1$$

and $$H_{BL_{t-1}+1, t-1} + H_{BL_{t-1}, t-1} \ge 3 \qquad (1)$$

$$BR_t > BR_{t-2} + 1$$

and $$H_{BL_{t-2}+1, t-2} + H_{BL_{t-2}, t-2} \ge 3$$

and $$|H_{i,t-1}| > 3. \qquad (2)$$

However, if the two conditions below are satisfied instead, it may be determined that a left wave has occurred in the sequence:

$$BL_t > BL_{t-1} - 1$$

and $$H_{BR_{t-1}-1,t-1} + H_{BR_{t-1},t-1} \geq 3 \quad (3)$$

$$BL_t < BL_{t-2} - 1$$

and $$H_{BR_{t-2}-1,t-2} + H_{BR_{t-2},t-2} \geq 3$$

and $$|H_{i,t-1}| > 3. \quad (4)$$

To deal with cases where the track of a hand is not entirely horizontal, 45 degree histograms, 135 degree histograms and/or the like may be computed for detection as well. As an example, for a 45 degree histogram, the expression (3) above may be replaced by:

$$H_{k,t} = \sum_{i=1}^{N} \sum_{j=1}^{M} (Mov(Z_{j,i,t}) | i + j = k), \, 2 \leq k \leq M + N \quad (6)$$

Similarly, equation (7) may be employed for us in 135 degree histograms:

$$H_{k,t} = \sum_{i=1}^{N} \sum_{j=1}^{M} (Mov(Z_{j,i,t}) | j - i = k), \, 1 - N \leq k \leq M - 1. \quad (7)$$

The conditions above (with or without modifications for detection of angles other than 0 degrees) may be used for hand wave detection in various different orientations. An example of a vertical histogram of a sample sequence is shown in line 220 of FIG. 4. For a forward-to-backward hand wave, the vertical histogram may be replaced with a horizontal histogram and equations (6) and (7) may be used to estimate direction. For an up-down gesture, vertical histograms may again be used to estimate direction. If in a set of consecutive frames, the trend of moving blocks is toward the two end of the histogram, the direction must be down. Otherwise, the direction will be up.

To eliminate or reduce the likelihood of false alarms caused by background movement (which may occur in driving environments or other environments where the user is moving), the region-wise color histogram may also be used to verify detection (as indicated in operation 150 of FIG. 3). In this regard, it may be expected that a hand wave would cause a large color distribution change. Thus, some example embodiments may device a frame into a predetermined number of regions or sub-regions (e.g., 6 sub-regions in one example) and a three dimensional histogram regarding the RGB (red, green and blue) values may be determined for each sub-region. To make the histogram more stable, each channel of RGB may be down-scaled from 256 to 8, to provide six, 512-dimensional histograms, e.g., $HC_{1,t}$, $HC_{2,t}$, $HC_{3,t}$, $HC_{4,t}$, $HC_{5,t}$, $HC_{6,t}$.

After detection of a hand wave, $HC_{1,t}$-$HC_{6,t}$ may be used for verification. Specifically, for example, if an ith sub-region contains moving blocks, the squared Euclidean distance may be computed between $HC_{i,t}$ and $HC_{i,t-1}$.

Accordingly, some example embodiments may provide for enabling users to utilize quick and accurate gesture detection in various environments including mobile environments. Some example embodiments may be used to detect gestures such as hand waves or even fingertip movements and other gestures. Moreover, since some example embodiments employ a skin-like color analysis, the influence of background objects may be reduced to improve user experience. Some embodiments may not require any specific hand shape or size and may therefore work well in practical operating environments. Example embodiments may also avoid the use of complicated statistical or geometrical models so that speed may be increased relative to many other mechanisms that employ such models.

Figure 5:
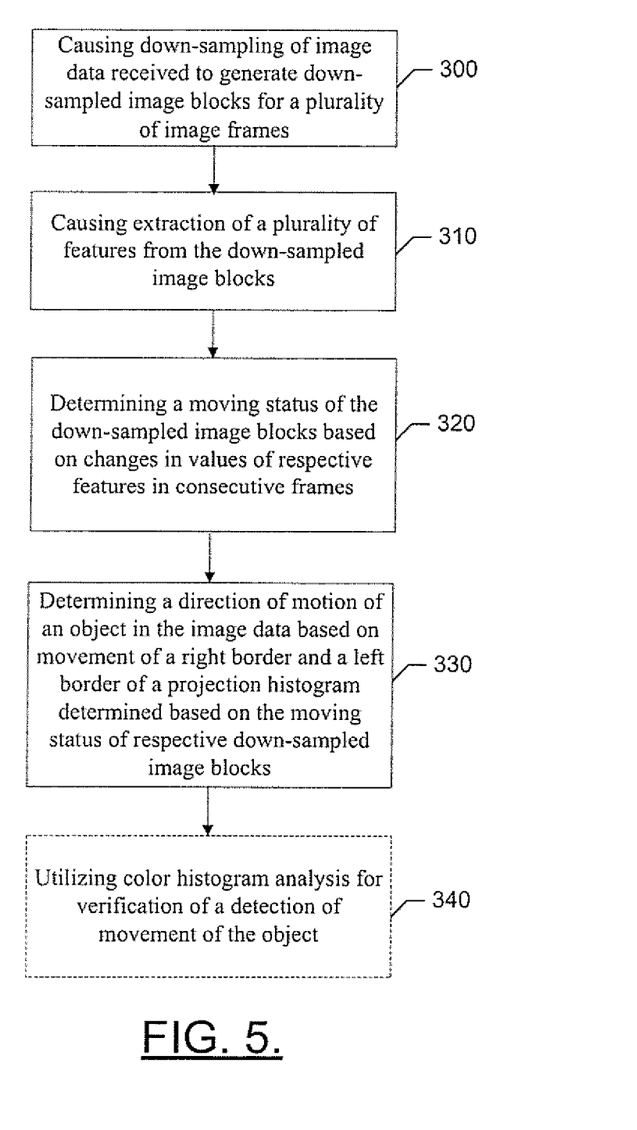
FIG. 5 is a block diagram according to an example method for providing a mechanism for employing gesture recognition according to an example embodiment of the present invention.

FIG. 5 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (either mobile or fixed) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 5, may include causing down-sampling of image data received to generate down-sampled image blocks for a plurality of image frames at operation 300, causing extraction of a plurality of features from the down-sampled image blocks at operation 310, determining a moving status of the down-sampled image blocks based on changes in values of respective features in consecutive frames at operation 320, and determining a direction of motion of an object in the image data based on movement of a right border (as an example of a first border) and a left border (as an example of a second border) of a projection histogram determined based on the moving status of respective down-sampled image blocks at operation 330.

In some embodiments, certain ones of the operations above may be modified or further amplified as described below. Moreover, in some embodiments additional optional operations may also be included (an example of which is shown in dashed lines in FIG. 5). It should be appreciated that each of the modifications, optional additions or amplifications below may be included with the operations above either alone or in combination with any others among the features described herein. In some embodiments, the method may further include utilizing color histogram analysis for verification of a detection of movement of the object at operation 340. In an example embodiment, causing extraction of the plurality of features may include extracting mean luminance, variance of the luminance, a mean red channel value, a mean green channel value, a mean blue channel value or a mean normalized red channel value. In some cases, determining the direction of motion may include determining a non-moving block to be a block without any moving block among connected neighbor blocks. In some example embodiments, determining the direction of motion may include utilizing a histogram that corresponds to a detectable direction of motion of the object. In an example embodiment, determining the direction of motion may include utilizing respective histograms computed for more than one of horizontal movement, vertical movement, substantially forty-five degree movement and substantially one hundred thirty-five degree movement. In some cases, determining a moving status may include determining motion based on blocks showing motion with respect to changes in a normalized red value in consecutive frames to reduce background interference with motion detection.

In an example embodiment, an apparatus for performing the method of FIG. 5 above may comprise a processor (e.g., the processor 70) configured to perform some or each of the operations (300-340) described above. The processor 70 may, for example, be configured to perform the operations (300-340) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-340 may comprise, for example, the gesture recognition manager 80 (or respective different components thereof). Additionally or alternatively, at least by virtue of the fact that the processor 70 may be configured to control or even be embodied as the gesture recognition manager 80, the processor 70 and/or a device or circuitry for executing instructions or executing an algorithm for processing information as described above may also form example means for performing operations 300-340.

An example of an apparatus according to an example embodiment may include at least one processor and at least one memory including computer program code. The at least one memory and the computer program code may be configured to, with the at least one processor, cause the apparatus to perform the operations 300-340 (with or without the modifications and amplifications described above in any combination).

An example of a computer program product according to an example embodiment may include at least one computer-readable storage medium having computer-executable program code portions stored therein. The computer-executable program code portions may include program code instructions for performing operation 300-340 (with or without the modifications and amplifications described above in any combination).

In some cases, the operations (300-340) described above, along with any of the modifications may be implemented in a method that involves facilitating access to at least one interface to allow access to at least one service via at least one network. In such cases, the at least one service may be said to perform at least operations 300 to 340.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   causing down-sampling of image data received to generate down-sampled image blocks for a plurality of image frames;
   causing extraction of a plurality of features from the down-sampled image blocks;
   determining a moving status of the down-sampled image blocks based on changes in values of respective features in consecutive frames;
   determining, using a processor, a direction of motion of an object in the image data based on movement of a first border and a second border of a projection histogram determined based on the moving status of respective down-sampled image blocks, wherein determining the direction of motion comprises determining a non-moving block based on the moving status of connected neighbor blocks; and
   verifying a detection of movement of the object based on color histogram analysis, wherein the verification of the detection of movement comprises dividing one or more frames into a predetermined number of regions and sub-regions, determining a three dimensional histogram corresponding to each of the predetermined number of sub-regions, and down sampling one or more channels corresponding to the three dimensional histogram.

2. The method of claim 1, wherein causing extraction of the plurality of features includes extracting mean luminance, variance of the luminance, a mean red channel value, a mean green channel value, a mean blue channel value or a mean normalized red channel value.

3. The method of claim 1, wherein determining the direction of motion comprises utilizing a histogram that corresponds to a detectable direction of motion of the object.

4. The method of claim 3, wherein determining the direction of motion comprises utilizing respective histograms computed for more than one of horizontal movement, vertical movement, substantially forty-five degree movement and substantially one hundred thirty-five degree movement.

5. The method of claim 1, wherein determining a moving status comprises determining motion based on blocks showing motion with respect to changes in a normalized red value in consecutive frames to reduce background interference with motion detection.

6. An apparatus comprising at least one processor and at least one memory including computer program code, the at least one memory and the computer program code configured to, with the processor, cause the apparatus to at least:
cause down-sampling of image data received to generate down-sampled image blocks for a plurality of image frames;
cause extraction of a plurality of features from the down-sampled image blocks;
determine a moving status of the down-sampled image blocks based on changes in values of respective features in consecutive frames;
determine a direction of motion of an object in the image data based on movement of a first border and a second border of a projection histogram determined based on the moving status of respective down-sampled image blocks, wherein determining the direction of motion comprises determining a non-moving block based on the moving status of connected neighbor blocks; and
verify a detection of movement of the object based on color histogram analysis, wherein the verification of the detection of movement comprises dividing one or more frames into a predetermined number of regions and sub-regions, determining a three dimensional histogram corresponding to each of the predetermined number of sub-regions, and down sampling one or more channels corresponding to the three dimensional histogram.

7. The apparatus of claim 6, wherein the memory and the computer program code are configured to, with the processor, cause the apparatus to extract the plurality of features by extracting mean luminance, variance of the luminance, a mean red channel value, a mean green channel value, a mean blue channel value or a mean normalized red channel value.

8. The apparatus of claim 6, wherein the memory and the computer program code are further configured to, with the processor, cause the apparatus to determine the direction of motion by utilizing a histogram that corresponds to a detectable direction of motion of the object.

9. The apparatus of claim 8, wherein the memory and the computer program code are further configured to, with the processor, cause the apparatus to determine the direction of motion by utilizing respective histograms computed for more than one of horizontal movement, vertical movement, substantially forty-five degree movement and substantially one hundred thirty-five degree movement.

10. The apparatus of claim 6, wherein the memory and the computer program code are further configured to, with the processor, cause the apparatus to determine a moving status by determining motion based on blocks showing motion with respect to changes in a normalized red value in consecutive frames to reduce background interference with motion detection.

11. A computer program product comprising at least one non-transitory computer-readable storage medium having computer-executable program code instructions stored therein, the computer-executable program code instructions comprising program code instructions to:
cause down-sampling of image data received to generate down-sampled image blocks for a plurality of image frames;
cause extraction of a plurality of features from the down-sampled image blocks;
determine a moving status of the down-sampled image blocks based on changes in values of respective features in consecutive frames;
determine a direction of motion of an object in the image data based on movement of a first border and a second border of a projection histogram determined based on the moving status of respective down-sampled image blocks, wherein determining the direction of motion comprises determining a non-moving block based on the moving status of connected neighbor blocks; and
verify a detection of movement of the object based on color histogram analysis, wherein the verification of the detection of movement comprises dividing one or more frames into a predetermined number of regions and sub-regions, determining a three dimensional histogram corresponding to each of the predetermined number of sub-regions, and down sampling one or more channels corresponding to the three dimensional histogram.

12. The computer program product of claim 11, wherein program code instructions for causing extraction of the plurality of features include instructions for extracting mean luminance, variance of the luminance, a mean red channel value, a mean green channel value, a mean blue channel value or a mean normalized red channel value.

13. The computer program product of claim 11, wherein program code instructions to determine the direction of motion include instructions for utilizing a histogram that corresponds to a detectable direction of motion of the object.

14. The computer program product of claim 13, wherein program code instructions to determine the direction of motion include instructions for utilizing respective histograms computed for more than one of horizontal movement, vertical movement, substantially forty-five degree movement and substantially one hundred thirty-five degree movement.

* * * * *